Patented May 1, 1934

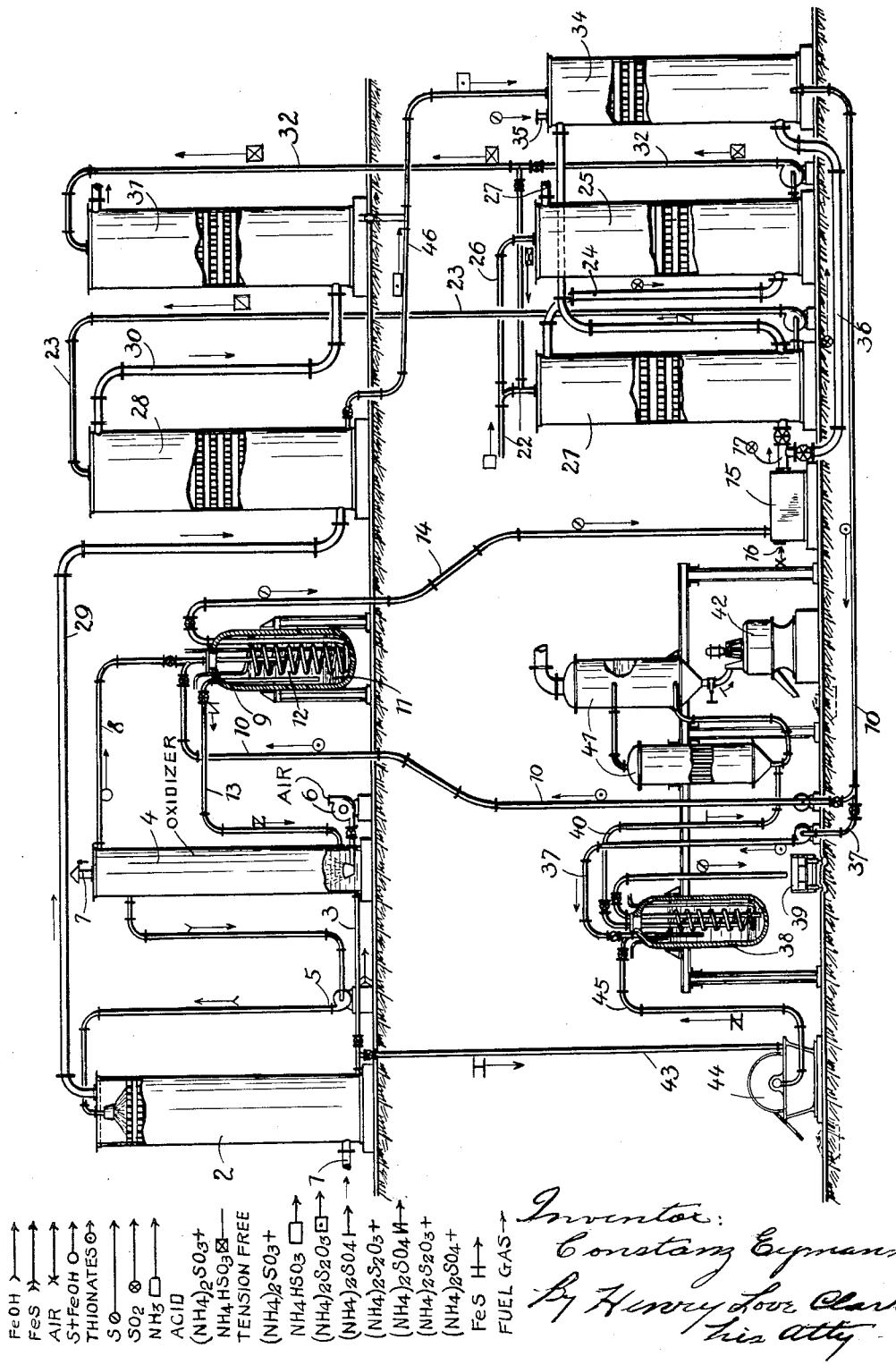

1,957,253

UNITED STATES PATENT OFFICE 1,957,253

PROCESS FOR THE REMOVAL OF HYDROGEN SULPHIDE FROM GASES

Constanz Eymann, Essen-on-the-Ruhr, Germany, assignor, by mesne assignments, to The Koppers Company of Delaware, Pittsburgh, Pa., a corporation of Delaware Application August 20, 1931, Serial No. 558,248
In Germany August 21, 1930

9 Claims. (Cl. 23—225)

The invention relates to the removal of hydrogen sulphide and possibly ammonia out of gases especially coal distillation gases and more particularly to the removal of hydrogen sulphide from gases by means of an aqueous metal hydroxide suspension for instance an iron manganese, zinc hydroxide suspension where sulphur is recovered or burned to sulphur dioxide from which by means of ammonia the ammonia salts of the sulphurous acid and ammonium sulphate and sulphur are produced. Such a process is in the pending application of Dr. C. I. Hansen, entitled "Process for removing hydrogen sulphide and ammonia from gases", executed June 2nd, 1931, filed June 13, 1931, Serial No. 544,255.

According to the process of the patent application mentioned of Dr. C. I. Hansen, a part of the hydrogen sulphide by means of an aqueous iron hydroxide suspension is combined according to the equation:

$$2Fe(OH)_3 + 3H_2S = Fe_2S_3 + 6H_2O$$

whereupon the sulphide of iron resulting from this reaction is reformed by oxidation according to the following equation $$2FeS + 3O + 3H_2O = 2Fe(OH)_3 + 2S$$

iron hydroxide together with elementary sulphur.

For cleaning the elementary sulphur obtained during the absorption process and from the subsequent regeneration of the washing liquid from the unavoidable iron salts carried forward the sulphur is heated up according to the older patent application in an autoclave with sulphuric acid under pressure, whereby the undissoluble iron compounds attached to the sulphur are converted into soluble iron sulphate. Thereby the sulphuric acid produced by the partial burning of the sulphur should be reduced to sulphur trioxide.

The object of the invention is to provide improvements of the above mentioned process for the removal of the hydrogen sulphide from gases which allows, in case the sulphuric acid for the purification of the sulphur resulting from the treatment of gases with iron hydroxide suspension and from the regeneration of same, is not available, for purification of the sulphur by means of solutions which are produced in the process itself.

For this purpose according to the invention, the sulphur required for the purification of the gases and for the regeneration of the spent washing liquid is treated with the aqueous solution of ammonium thionates, whereby in the range of the present patent application ammonia salts of the sulphurous acid of the thio-sulphur acid or of the polythionate acids, or mixtures of these compounds are understood. Preferably this treatment according to this invention is effected by heating under pressure. In this case, the thionate solution should preferably contain more sulphur dioxide in a free or combined form than will be required by the heating under pressure of the thionate solution, bearing in mind the reaction $3SO_2 = 2SO_3 + S$ for the formation of neutral ammonium sulphate.

Ammonium thionate solutions result during the above described process by the absorption of the sulphurous acid, resulting from the burning of the sulphur obtained from the hydrogen sulphide produced in the washing process, by means of ammonia to form a solution of ammonium sulphite and ammonium bisulphite and thereafter effecting the conversion of these sulphite-bisulphite solutions by means of hydrogen sulphide and the sulphurous acid to form the polythionate solution containing thiosulphate.

Solutions of the compounds indicated have the quality of dissolving iron sulphide with the formation of soluble iron salts of the sulphur oxygen acids. For instance, ammonia bisulphite reacts with sulphide iron according to the equation.

$$2FeS + 6NH_4HSO_3 = 2FeS_2O_3 + (NH_4)_2S_2O_3 + 2(NH_4)_2SO_3 + 3H_2O$$

The additional compounds resulting in the intermediate stage from the conversion of the thiosulphate into polythionate between thiosulphate and sulphurous acid, acts on the iron sulphide according to the following equation $$3(NH_4)_2S_2O_3.SO_2 + 2FeS = 3(NH_4)_2S_2O_3 + 2FeS_2O_3 + S$$

Finally polythionate dissolves iron sulphide according to the following equation $$(NH_4)_2S_4O_6 + FeS = FeS_2O_3 + (NH_4)_2S_2O_3 + S$$

By the process according to the invention, there results, therefore, on the purification of the oxidizer sulphur, a solution of iron thiosulphate and ammonium salts of the sulphurous acid and the thiosulphur acid in addition to more or less large quantities of ammonium sulphate as the polythionate separates out easily on heating into sulphate and sulphur. Moreover, the solution contains also a small quantity of iron sulphate as from the iron thiosulphate iron polythionate is easily formed, which converts into iron sulphate on the splitting up of the sulphur. Of these compounds as is well-known iron thiosulphate and iron sulphate react with ammonia and the hydrogen sulphide according to the equations $$FeS_2O_3 + 2NH_3 + 1H_2S = (NH_4)_2S_2O_3 + FeS$$
$$FeSO_4 + 2NH_3 + H_2S = FeS + (NH_4)_2SO_4$$

These reactions take place as has been ascertained in the presence of iron hydroxide or ammonium salts of the sulphur oxygen acid.

The washing liquid circulating in the iron hydroxide washer and in the oxidizer is in the process according to this invention gradually enriched with ammonia salts of the sulphur oxygen acid. In order to convert same into ammonium sulphate there is run off continuously or intermittently a portion of the liquid circulating in the iron hydroxide washer or oxidizer and after the extraction of the soluble and insoluble metal compounds, this liquid is carried forward to the heated autoclave for the conversion of the ammonium polythionate and ammonium thiosulphate produced during this process or it is mixed with the liquid flowing to the autoclave.

The process according to the invention affords the important advantage that the plant which was necessary in the old process for the recovery of sulphuric acid is done away with without it being necessary to replace same with other apparatus. In this way the process according to the key patent is considerably simplified and cheapened.

On the drawing there is shown diagrammatically a contrivance for the carrying out of the process according to this invention.

In the case of the apparatus shown in the drawing the gas enters the hydroxide washer 2 by means of the pipe line 1 in which the gas is brought into contact with an aqueous iron hydroxide suspension. The iron hydroxide suspension flows at the foot of the washing tower 2 through the pipe line 3 into the oxidizer 4 in which again air is blown in from below by means of a blower 6 and escapes at the top of the oxidizer at the point 7. In the oxidizer the iron sulphide resulting from the iron hydroxide and hydrogen sulphide is reconverted into iron hydroxide. The liquid is then led back by the pump 5 into the washing tower 2. Continually or intermittently a portion of the foam sulphur which is carried up by the air and is a mixture of elementary sulphur and iron hydroxide and is drawn off out of the oxidizer through the pipe 8 into the autoclave 9 in which the foam sulphur is heated up with a solution of ammonium thionates under pressure. By the term thionates there are to be understood salts of the sulphurous acid of the thiosulphuric acid or of the polythionate acid. These compounds dissolve the iron oxygen compounds, forming iron thionate and sulphur. The temperature in the autoclaves is preferably maintained at such a height that this process of solution proceeds very rapidly and the sulphur resulting is precipitated in a liquid form to the bottom of the autoclave. The ammonium salts which serve for the solution of the iron compounds are carried forward to the autoclave 9 by the pipe line 10 from the polythionate tower 34. The clear liquid indicated on the drawing by 12 is carried back through the pipe line 13 into the fluid circulating through the oxidizer and the washer 2. The liquid sulphur indicated by the number 11 flows on the other hand through the pipe line 14 to a sulphur burner 15, where it is converted by burning into sulphur dioxide. The gas escaping from the burners through pipe line 17 is used at once for the production of an ammonium sulphite bisulphite solution or of an ammonium polythionate solution according to the process indicated in the above mentioned patent application.

From the burner 15 the gases reach by the pipe line 17 the washer 21 to which ammonia in the form of concentrated ammonia water is brought from above through the pipe line 22. The quantity of ammonia is so measured that through the pipe line 23 provided for on the bottom of the washer 21 an ammonia sulphite bisulphite solution having a sulphurous acid tension flows off.

From the washer 21 the burner gases go forward through the pipe line 24 to a washer 25 in which likewise from above by the pipe line 26 ammonia water is supplied, in this case however in such quantities that in the washer 25 an ammonium sulphite bisulphite solution results having no tension of ammonia nor sulphur dioxide so that the waste air escaping from the pipe line 27 does not contain sulphurous acid.

The acid sulphite bisulphite solution produced in the washer 21 is led through pipe line 23 into a washer 28 at the foot of which by means of the pipe line 29 the gas from the iron hydroxide washer 2 which still contains hydrogen sulphide is introduced. The gas comes therefore in the washer 28 in contact with the acid sulphite bisulphite solution whereby in accordance with the equation given above it loses its entire contents of ammonia and hydrogen sulphide. The gas takes up however in this washer correspondingly to the acid tension of the washing fluid used in this washer a certain amount of sulphur dioxide. In order to get this out of the gas, the latter is carried forward through the pipe line 30 in a washer 31 which is sprayed from above with a tension free ammonium-sulphite-bisulphite solution produced in washer 25 for which purpose the washer 31 is connected up with the washer 25 by the pipe line 32. The spent washing fluid from the washers 28 and 31 flows through a common pipe line 46 in a washing tower 34 in which the ammonium thiosulphate contained in the spent liquor is possibly converted wholly or partly into polythionate by means of sulphurous acid which is supplied by the pipe line 36 into the washer 34. In case the spent liquor has great contents of ammonium sulphite or (and) ammonium bisulphite sulphur is added to the liquor in the washer 34 through the pipe 35, whereby according to the equation $$(NH_4)_2SO_3 + S = (NH_4)_2S_2O_3$$

thiosulphate is formed. The solutions flowing off from the washing tower 34 reach finally through the pipe line 37 a pressure vessel 38 in which they are converted by means of heating under pressure up to a temperature above 160° C. into ammonium sulphate and sulphur. The sulphur resulting which has collected during and after the reaction on the bottom of the pressure vessel is led off into the sulphur boxes 39 whereas the sulphate solution is led forward under pressure through the pipe line 40 into an evaporating apparatus 41 in which the sulphate of ammonia solution is concentrated up to the point of crystallization. The salt thrown down is finally dried in a centrifugal 42.

The fluid in the washing tower 2 contains in addition to the iron salts also a large quantity of ammonium thiosulphate and ammonium sulphate which is enriched in the course of the process in the solution and, therefore, must be continually drawn off. For this purpose a portion of the fluid from the washing tower 2 is drawn off from time to time at the foot of this washer i. e. at the point where the fluid no longer contains soluble iron salts, through the pipe line 43, freed in a filter press 44 or in a separator box from the insoluble iron compounds and then led forward by the pipe line 45 to the pressure vessels 38 for the decomposition of the thionate.

The invention as hereinabove set forth is embodied in a particular form, but may be variously embodied within the scope of the claims hereinafter made.

I claim:

1. A process for the removing of hydrogen sulphide from gases, comprising treating the gas with an aqueous suspension of a metal hydroxide to remove hydrogen sulphide therefrom, converting the thereby formed metal sulphide into metal hydroxide, separating the sulphur produced by the treating of the gas and the regenerating of the spent washing liquor, thereafter treating the gas with an aqueous solution of thionate to remove residual hydrogen sulphide in combination with ammonia of the gas, and treating the sulphur thus recovered from the hydroxide washing and regeneration steps with the aqueous solution of ammonium thionate of the aforesaid thionate gas treatment step to remove traces of metal hydroxide from said recovered sulphur.

2. A process for the removing of hydrogen sulphide from gases, comprising treating the gas with an aqueous suspension of a metal hydroxide to remove hydrogen sulphide therefrom, converting the thereby formed metal sulphide into metal hydroxide, separating the sulphur produced by the treating of the gas and the regenerating of the spent washing liquor, thereafter treating the gas with an aqueous solution of thionate to remove residual hydrogen sulphide in combination with ammonia of the gas, and treating the sulphur thus recovered from the hydroxide washing and regeneration steps with the aqueous solution of ammonium thionate of the aforesaid thionate gas treatment step to remove traces of metal hydroxide from said recovered sulphur said last mentioned thionate containing during the sulphur treatment more sulphur dioxide than is necessary for the decomposing of said thionates into neutral ammonium sulphate and sulphur.

3. A process as set forth in claim 1, wherein the treatment of the sulphur to remove traces of metal hydroxide is effected by heating the sulphur with the ammonium thionate solution.

4. A process as set forth in claim 1, wherein the treatment of the sulphur to remove traces of metal hydroxide is effected by heating the sulphur with the ammonium thionate solution under pressure.

5. A process as claimed in claim 1, and in which the liquor obtained by the treating of the sulphur with a thionate solution to remove traces of metal hydroxide is, after separating the sulphur therefrom, mixed with the aqueous metal hydroxide suspension, the mixture then being used for treating the gas to be purified in the metal hydroxide gas treating step.

6. A process as set forth in claim 1, and in which the liquor obtained by the treating of the sulphur with the thionate solution to remove traces of metal hydroxide is, after separating the sulphur therefrom, mixed with the aqueous metal hydroxide suspension, the mixture then being used for treating gas to be purified in the metal hydroxide gas treating stage, and in which part of the spent metal hydroxide washing liquor is withdrawn continuously or intermittently from said gas treating stage and before being regenerated and all metal compounds are then separated therefrom and after said separation said liquor is heated under pressure until ammonium sulphate and sulphur are formed therefrom.

7. A process of removing ammonia and hydrogen sulphide from gases containing the same with production of ammonium sulphate and free sulphur therefrom which comprises: treating the gas with an aqueous suspension of a metal hydroxide to remove $H_2S$ therefrom, reconverting the metal sulphide thereby formed into hydroxide, separating the sulphur produced from said metal sulphide regeneration stage and returning the metal hydroxide to its gas washing stage, thereafter treating the gas with an aqueous solution of thionate to remove residual $H_2S$ in combination with ammonia of the gas; treating the spent solution from the thionate gas treating stage with $SO_2$ and converting the so treated solution to ammonium sulphate and sulphur; treating the sulphur separated from the metal sulphide regeneration stage with thionate of the thionate gas treatment stage to remove traces of metal hydroxide from the so treated sulphur; separating the so treated sulphur from said last mentioned sulphur treatment step from the clear liquid resulting from said step, converting this sulphur to $SO_2$, forming the thionate for the thionate gas treatment step with part of said $SO_2$ and effecting the aforesaid $SO_2$ treatment of spent thionate from the thionate gas treatment with another part of said $SO_2$; mixing the so separated clear liquid with the regenerated metal hydroxide returned to the metal hydroxide gas treatment stage and effecting the gas treatment therewith, withdrawing spent washing liquor from the metal hydroxide treating step before being regenerated, separating insoluble metal compounds therefrom, and effecting the aforesaid conversion to ammonium sulphate and sulphur with the insoluble metal-free spent washing liquor.

8. A process for the removal of hydrogen sulphide from gases comprising: treating the gas with an aqueous suspension of a metal hydroxide to remove hydrogen sulphide therefrom, converting the thereby formed metal sulphide into metal hydroxide, separating the free sulphur so produced, and treating the so separated sulphur with an aqueous solution of ammonium thionate to remove traces of metal hydroxide therefrom.

9. A process comprising treating free sulphur containing traces of metal hydroxide with an aqueous solution of ammonium thionate to remove the metal hydroxide therefrom.

CONSTANZ EYMANN.